(12) United States Patent
Bhattacharyya et al.

(10) Patent No.: US 9,619,397 B2
(45) Date of Patent: Apr. 11, 2017

(54) COST SENSITIVE BROWSER CACHE CLEANUP BASED ON WEIGHTED PROBABILISTIC CACHED ITEM USAGE

(71) Applicant: International Business Machines Corporation, Armonk, NY (US)

(72) Inventors: Anamitra Bhattacharyya, Chelmsford, MA (US); Krishnamohan Dantam, Chelmsford, MA (US); Ravi K. Kosaraju, Pittsford, NY (US); Manjunath D. Makonahalli, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/925,253

(22) Filed: Oct. 28, 2015

(65) Prior Publication Data

US 2017/0046269 A1 Feb. 16, 2017

Related U.S. Application Data

(63) Continuation of application No. 14/823,827, filed on Aug. 11, 2015.

(51) Int. Cl.
*G06F 12/00* (2006.01)
*G06F 12/0891* (2016.01)
(Continued)

(52) U.S. Cl.
CPC ........ *G06F 12/0891* (2013.01); *H04M 15/31* (2013.01); *G06F 12/08* (2013.01);
(Continued)

(58) Field of Classification Search
CPC ............ G06F 12/0891; G06F 2212/60; G06F 17/30902; G06F 12/0868; G06F 12/121;
(Continued)

(56) References Cited

U.S. PATENT DOCUMENTS

2005/0027943 A1* 2/2005 Steere .................. G06F 12/121
 711/133
2010/0095067 A1* 4/2010 Kosaraju ........... G06F 17/30902
 711/126

(Continued)

FOREIGN PATENT DOCUMENTS

WO 2014028672 A1 2/2014

*Primary Examiner* — Hong Kim
(74) *Attorney, Agent, or Firm* — Garg Law Firm, PLLC; Rakesh Garg; Christopher K. McLane

(57) ABSTRACT

For browser cache cleanup, to consider for eviction a data item stored in a cache of a browser application in a device, a probability that the data item will be needed again during a period after the eviction is computed. A type is determined of a network that will be available at the device during the period. A cost is computed of obtaining the data item over a network of the type, from a location of the device during the period. Using the probability and the cost, a weight of the data item is computed. The weight is associated with the data item as a part of associating a set of weights with a set of data items in the cache. The data item is selected for eviction from the cache because the weight is a lowest weight in the set of weights.

8 Claims, 6 Drawing Sheets

(51) Int. Cl.
  *H04M 15/00*        (2006.01)
  *H04L 29/08*        (2006.01)
  *G06F 12/08*        (2016.01)
  *G06F 12/0868*      (2016.01)
  *G06F 12/121*       (2016.01)

(52) U.S. Cl.
  CPC ........ *G06F 12/0868* (2013.01); *G06F 12/121* (2013.01); *G06F 2212/463* (2013.01); *G06F 2212/60* (2013.01); *H04L 67/2847* (2013.01)

(58) Field of Classification Search
  CPC .. G06F 2212/463; G06F 12/08; H04M 15/31; H04L 67/2847
  USPC ........ 709/218, 219; 711/135, 134, 133, 118, 711/144, 145
  See application file for complete search history.

(56) References Cited

U.S. PATENT DOCUMENTS

| | | |
|---|---|---|
| 2013/0067170 A1 | 3/2013 | Lam |
| 2014/0215001 A1 | 7/2014 | Tucek et al. |
| 2015/0215816 A1* | 7/2015 | Abou-Elkheir .. H04N 21/25866 370/230 |
| 2016/0212069 A1* | 7/2016 | Cohen .................... H04L 49/90 |

* cited by examiner

COST SENSITIVE BROWSER CACHE CLEANUP BASED ON WEIGHTED PROBABILISTIC CACHED ITEM USAGE

TECHNICAL FIELD

The present invention relates generally to a method for managing a browser cache in data processing systems. More particularly, the present invention relates to a method for cost sensitive browser cache cleanup.

BACKGROUND

A browser is a software application that executes on a data processing system and provides an interface through which a user or another application can request and receive content. For example, a user can input a Uniform Resource Locator (URL) of a website into a browser, the browser accesses a server of the website corresponding to the URL, receives content from the server, and presents the content to the user. As another example, an application invokes a browser to use the browser as an interface to receive inputs into the application and to provide the application outputs.

A browser maintains a cache. A browser cache is a portion of a local storage at the data processing system where the browser is executing, in which the browser saves content items (items) that the browser expects to reuse. For example, if a user accesses a particular website every day, the browser may save some graphical images from the website content into the browser cache so that the browser does not have to spend time obtaining the graphics repeatedly at each access to the website.

A browser cache enables the browser to improve a user experience by locally supplying some previously saved items locally without the latency of data communications over data networks in obtaining those items. As an example, by using a browser cache, the browser can load a webpage faster because only a part of the webpage has to be obtained from a server over a network, and the remaining part is reused from the browser cache at the local data processing system. As another example, a browser can cache the inputs supplied by a user during a previous use of a form, and auto-fill the form by reusing the cached inputs during a subsequent access to the form.

Browsers also execute in mobile devices, such as smartphones, tablet computers, and wearable devices. Presently, the amount of computing resources, including an amount of data storage space, that is available on mobile devices is significantly less than the amount of comparable computing resources that is available on other data processing systems. Consequently, although a browser can maintain a browser cache on a mobile device, the size of the browser cache is significantly smaller than on other data processing systems, such as laptop and desktop computers.

SUMMARY

The illustrative embodiments provide a method for cost sensitive browser cache cleanup. An embodiment computes, using a processor and a memory of a device, to consider for eviction a data item stored in a cache of a browser application, a probability that the data item will be needed again during a period after the eviction. The embodiment determines a type of a data network that will be available at the device during the period. The embodiment computes, a cost of obtaining the data item over a data network of the type of data network, from a location of the device during the period. The embodiment computes, using the probability that the data item will be needed again during the period, and further using the cost of obtaining the data item over the data network, a weight of the data item. The embodiment associates the weight with the data item as a part of associating a set of weights with a set of data items in the cache. The embodiment selects for eviction from the cache the data item because the weight is a lowest weight in the set of weights.

Another embodiment includes a computer usable program product comprising a computer readable storage device including computer usable code for browser cache cleanup.

Another embodiment includes a data processing system for browser cache cleanup.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
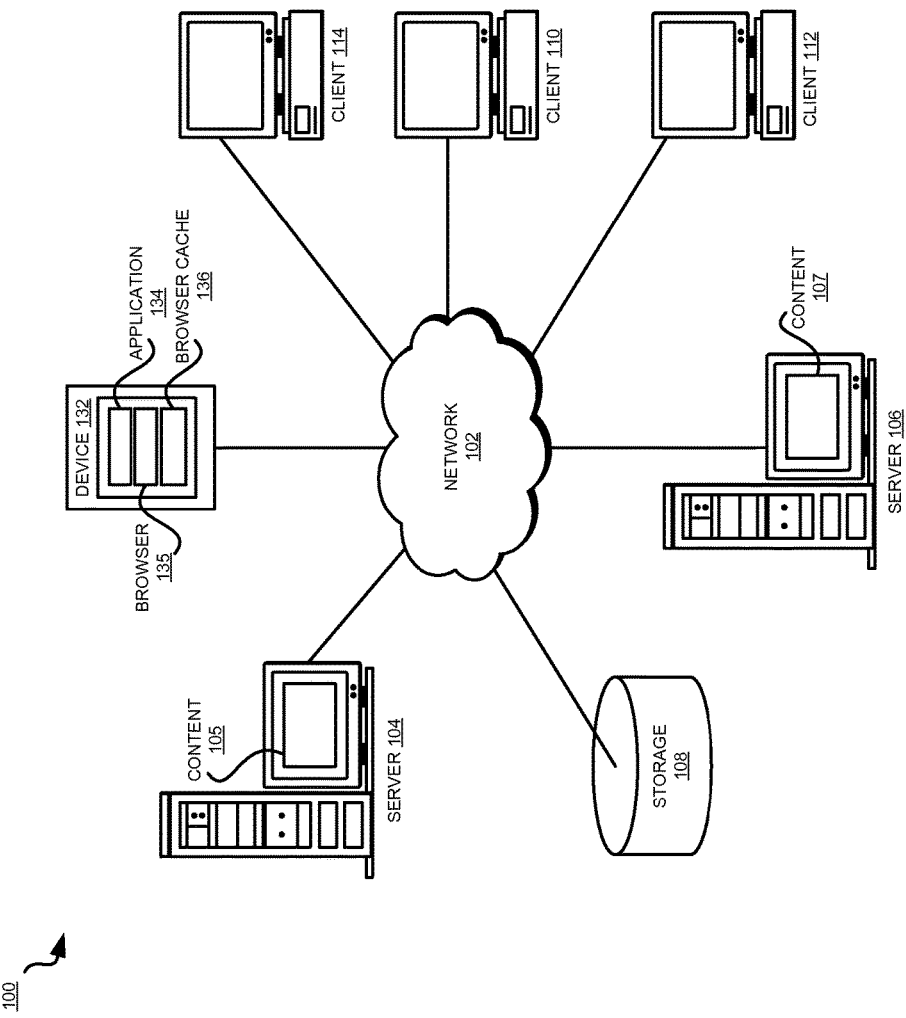
FIG. 1 depicts a block diagram of a network of data processing systems in which illustrative embodiments may be implemented.

Hereinafter, a browser cache is also interchangeably referred to as a cache. Any reference to a cache is a reference to a browser cache unless expressly distinguished where used.

The illustrative embodiments recognize that a browser cache has to be cleaned up from time to time. For example, when new items have to be stored in the browser cache and the browser cache does not have sufficient space to store the new item, some items from the cache have to be removed—or evicted—from the cache to make room for the new item. The process of removing a cached item from a browser cache is called cache cleanup.

According to one presently used method for cache cleanup, a browser cache is cleaned up by removing the oldest item in the cache. For example, if the browser cache is holding an item that has not been used in seven days and another item that has not been used in three days, the seven day old item will be evicted before the three day old item is evicted from the browser cache.

Another presently used method cleans up a browser cache by selecting the minimum number of item in the cache whose total size meets the immediate cache space requirement, and removes those selected items. For example, if a new item of size 4 Megabyte (MB) is to be stored in the browser cache, and only 1 MB is available in the browser cache that is holding one 4 MB item and ten 1 MB items, the single 4 MB item would be evicted instead of three 1 MB items. Some other methods of browser cache cleanup use variations of these and other techniques that use similar considerations.

The illustrative embodiments recognize that cache cleanup has cost consequences. For example, a user does not incur any cost, or incurs significantly less cost while using a Wi-Fi network for browsing, as compared to browsing using a cellular data plan. For example, the user can browse a website on the user's mobile device at little or no cost per byte of transferred data by connecting to the website over a Wi-Fi network at the user's home. But when the user accesses the same website over a data plan associated with the user's mobile device, the user pays a significantly higher per byte cost for transferring data from the same website.

The illustrative embodiments recognize that when a cached item will be used, where the mobile device be located when the cached item will be needed, and what type of network will be available to download the item if the item is not cached, are some of the factors that should be considered when evicting the cached item. The presently available methods for browser cache cleanup are not sensitive to these and other similarly purposed cost related factors when selecting cached items for eviction.

The illustrative embodiments used to describe the invention generally address and solve the above-described problems and other problems related to browser cache cleanup. The illustrative embodiments provide a method for cost sensitive browser cache cleanup.

An embodiment executes as an application in, or in conjunction with, a data processing system where a browser application is executing. An embodiment is particularly useful when implemented in a mobile device for cleaning up the browser cache of a mobile browser on the mobile device.

One embodiment uses a statistical model to assign weights to various cached items in a given browser cache. The embodiment selects one or more cached items to evict based on the weight associated with the cached items. Particularly, the embodiment evicts, or causes to be evicted, the cached item of the lowest weight first. When more than one cached items are to be evicted, the embodiment selects for eviction the items of progressively increasing weights, starting with the item of the lowest weight, from a sorted order of the cached items according to their weights.

Another embodiment constructs the statistical model for determining the weight of a particular cached item. One embodiment constructs and trains the statistical model—hereinafter also interchangeably referred to as the model or the weighting model—using a training set of items that were previously cached in a given browser cache.

For example, the embodiment accepts as inputs a training cached item, a day of the week and a time when the item was either cached or used from the cache (collectively referred to hereinafter as "use" of an item), a geographical location where the device was situated at the day and time of the use, and a type of network over which the item was obtained for caching. The embodiment collects the day and time information, the location information, and the type of network information from various components of the device where the embodiment executes. The embodiment associates such information with the cached items not only for training but for other operations described herein as well.

Using the training item and the associated day, time, location, and type of network information, the embodiment determines a usage pattern of the item. For example, a training item may be a cached portion of content on a news website, and the user may visit the new website at approximately 8 AM on weekdays from a Wi-Fi network at the user's home. A usage pattern of the training item is therefore each weekday morning, within an example one hour window around 8 AM, from the user's home location, and over a Wi-Fi network.

The embodiment uses the detected pattern to compute a probability that the item will be used during a certain time window or period. For example, in the case of above example training item and the usage pattern, the embodiment computes a higher than a threshold probability that the item will be used on a Tuesday morning and a lower than the threshold probability that the item will be used on a Wednesday evening or anytime on a Sunday.

The embodiment further identifies a type of network that will be available at the device during that certain period. For example, in the case of above example training item and the usage pattern, the embodiment determines that a Wi-Fi network will likely be available between 7:30 AM and 8:30 AM on a given Tuesday when the item is needed with higher than threshold probability, a Wi-Fi network—such as a Wi-Fi network at the user's office—will be available if the item is needed at below the threshold probability at 6 PM on a given Wednesday, and a cellular data network will be available if the item is needed at below the threshold probability anytime on a given Sunday.

Given the size of the training item, the embodiment computes a monetary cost of obtaining the data of the training item over a type of network that is applicable during the given period. For example, the cost of obtaining the training item may be 0.00 Dollars between 7:30 AM and 8:30 AM on a given Tuesday over a Wi-Fi network, but the cost of obtaining the same training item may be 0.07 Dollars between 4:00 PM and 5:00 PM on a given Sunday based on a pricing information of a cellular data network that the device uses.

The embodiment repeats this process for a variety of types of training items, over different days and times, for a variety of time periods, and over different types of networks. Thus, the embodiment trains the model to recognize statistical patterns of cost of obtaining an item or a type of item if the item is evicted and has to be re-obtained and re-cached when is needed again. The embodiment further trains the model to determine a likelihood or probability of needing the item or the type of item again during a time period.

The result of the training is a model, which can be represented as a function of the cost of re-caching and the likelihood of access. Given a cached item and the associated day, time, location, and type of network information, the function outputs a weight for the cached item. Thus, when an embodiment evaluates an actual cached item for eviction, this model computes a weight of the cached item, which the embodiment associates with the item for use within a specified period. This weight is then usable for selecting the cached items for eviction in a manner described in this disclosure.

A method of an embodiment described herein, when implemented to execute on a device or data processing system, comprises substantial advancement of the functionality of that device or data processing system for cost sensitive browser cache cleanup. For example, prior-art methods of cache cleanup only consider the size, age, and similar factors for evicting cached items from a browser cache. The prior-art methods of cache cleanup do not take into consideration the monetary cost of re-caching an item if the item is evicted from the cache. An embodiment evaluates the probability that an item, if evicted, will have to be re-obtained and re-cached at a future time. An embodiment further computes a monetary cost of re-obtaining and re-caching that item should the item be needed again after eviction. Such manner of cost sensitive browser cache cleanup is unavailable in presently available devices or data processing systems. Thus, a substantial advancement of such devices or data processing systems by executing a method of an embodiment is in reducing the cost of obtaining data for use in a browser.

The illustrative embodiments are described with respect to certain browsers, browser caches, cached items, probabilities, thresholds, time periods, weights, types of networks, costs, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
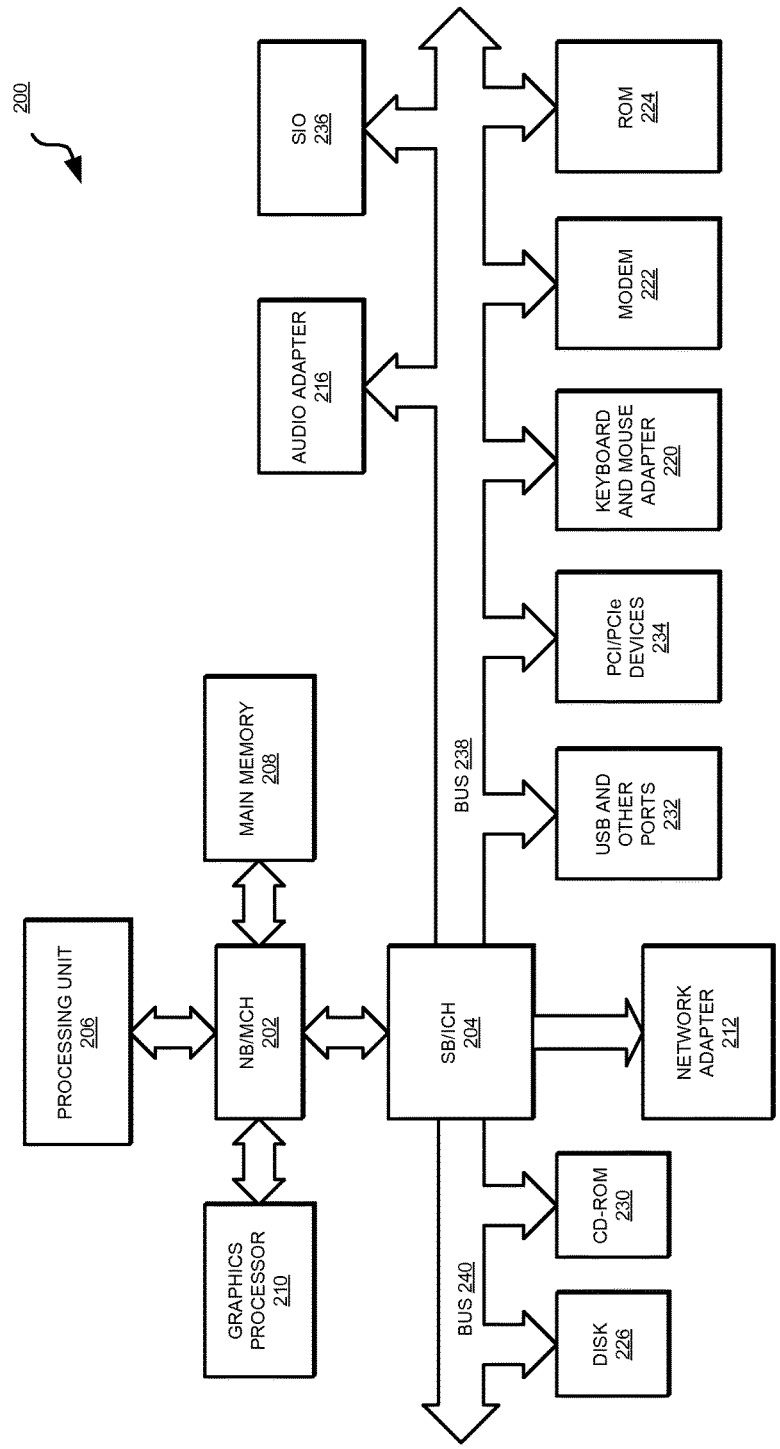
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 134 executes in device 132 and implements an embodiment described herein. Browser 135 uses browser cache 136 in device 132. For example, server 104 provides content 105 to browser 135. Browser 135 caches a portion of content 105 in browser cache 136 as a cached item. Similarly, server 106 provides content 107 to browser 135. Browser 135 caches all or a portion of content 107 in browser cache 136 as one or more different cached items. Application 134 operates to select a cached item in browser cache 136 for eviction from browser cache 136. According to one embodiment, application 134 evicts the selected cached item or causes the selected cached item to be evicted from browser cache 136.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
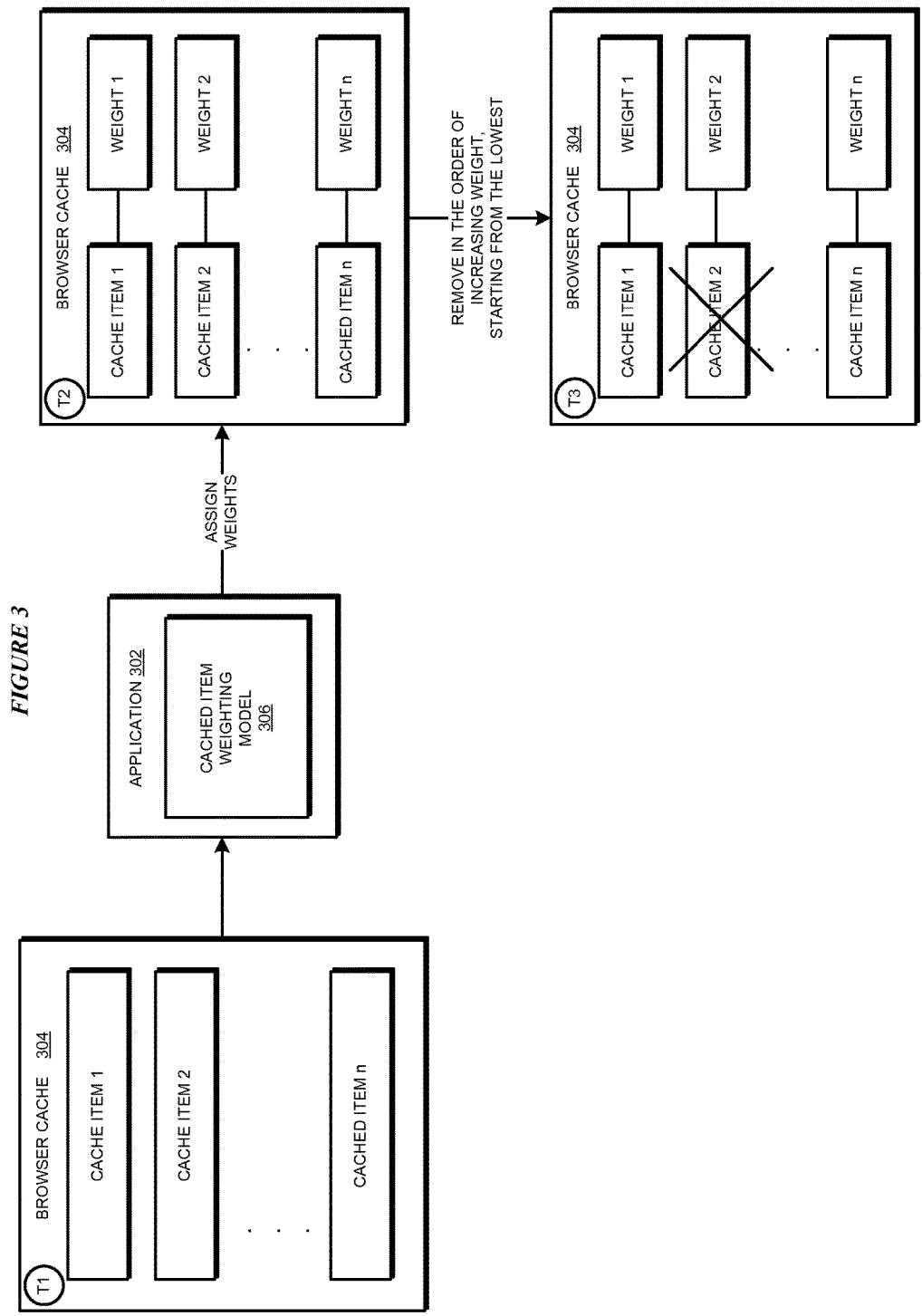
FIG. 3 depicts a block diagram of an example progression in a process for cost sensitive browser cache cleanup in accordance with an illustrative embodiment.

With reference to FIG. 3, this figure depicts a block diagram of an example progression in a process for cost sensitive browser cache cleanup in accordance with an illustrative embodiment. Application 302 is an example of application 134 in FIG. 1. Browser cache 304 is an example of browser cache 136 in FIG. 1, and is shown in different states at different times T1, 12, and 13.

As an example, at time T1, cache 304 includes cached item 1 (item 1), cached item 2 (item 2), and similarly any number of cached items through cached item n (item n). Application 302 includes cached item weighting model 306, which evaluates cached items in cache 304 and computes weights corresponding to those cached items.

For example, at time 12, by the operation of model 306 in application 302 in a manner described herein, application 302 associates weight 1 with item 1, weight 2 with item 2, and so on until weight n with item n. Note that not all cached items need to be weighted in this manner. For example, some cached items may be designated for special or different treatment, such as for permanent caching without eviction or for eviction according to different rules. According to one embodiment, such cached items can be omitted from the evaluation by model 306, and application 302 may omit assigning them weights and selecting them for eviction.

Furthermore, the weights associated with the cached items are depicted as located within cache 304 only as a non-limiting example. In one embodiment, application 302 stores the weight data of a cached item in cache 304. In another embodiment, application 302 stores the weight data of a cached item in a location other than cache 304. For example, application 302 can be configured to maintain a table, list, or other data structure (not shown) to hold the identifiers of the cached items and their corresponding weights. Such a data structure can be stored in any suitable storage device configured for use with the device where application 302 is executing, including but not limited to use as cache 304.

At time T3, application removes, or causes to be removed, from cache 304, a cached item of the lowest weight. For example, assume that weight 2 associated with item 2 is the lowest amongst weights 1 through n of items 1 through n in cache 304. Accordingly, application 302 selects or designates item 2 for eviction from cache 304.

Figure 4:
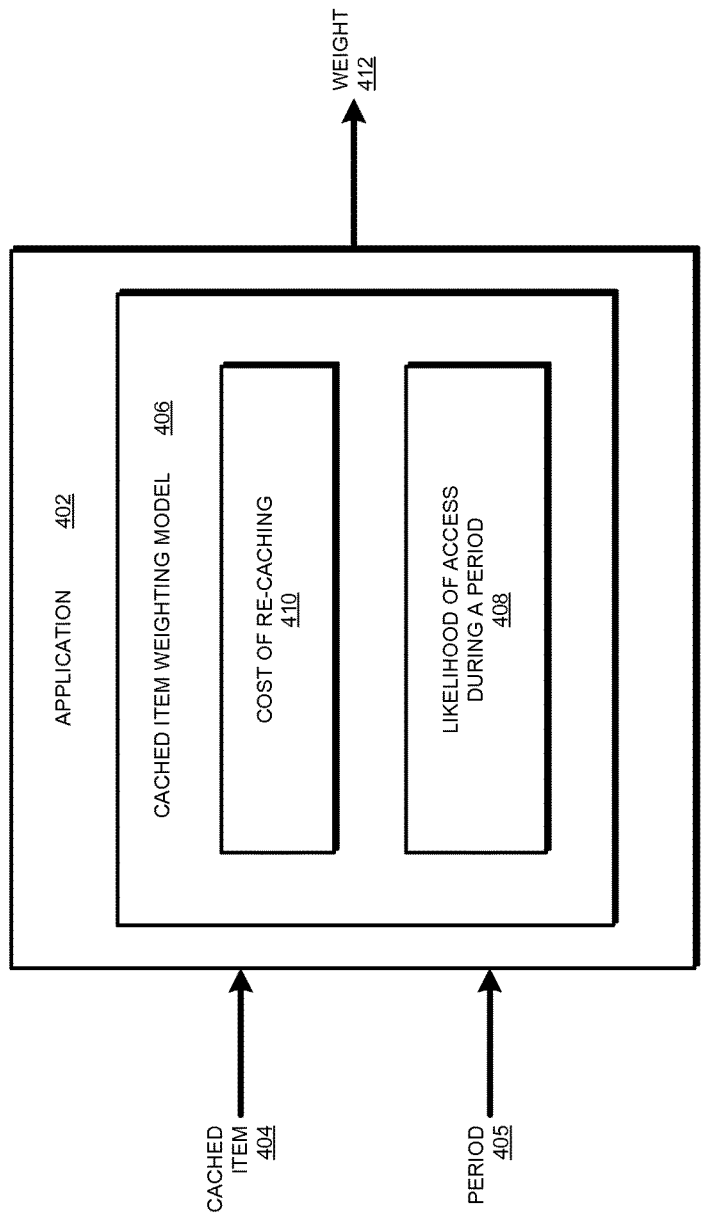
FIG. 4 depicts a block diagram of an example configuration of an application for cost sensitive browser cache cleanup in accordance with an illustrative embodiment.

With reference to FIG. 4, this figure depicts a block diagram of an example configuration of an application for cost sensitive browser cache cleanup in accordance with an illustrative embodiment. Application 402 is an example of application 302 in FIG. 3. Cached item 404 is an example of any of items 1 through n at time T1 in cache 304 in FIG. 3. Model 406 is an example of model 306 in FIG. 3.

In a manner described previously in this disclosure, model 406 has been trained previously to compute likelihood (probability) of access of various items or types of items that have been cached in the device where application 402 is executing, such as in cache 304 in FIG. 3. For cached item 404, component 408 computes a likelihood that item 404 will be accessed during specified period 405.

Component 410 computes a cost of obtaining the data of cached item 404 from a location and over a type of network that will be available during period 405.

In some cases, the period can be specified, such as in FIG. 4, where period 405 is depicted as an input. In other cases, a pattern of usage of an item can itself reveal a period when the item can be expected to be used. Recall the example of the user visiting a news website on weekdays mornings. The user can similarly have patterns of visits to a financial website during weekdays afternoons, a sports website during game season evenings, a political website during weekday evenings, a hobby-related website at various times during the weekends.

Accordingly, items cached from the news information sources, the financial information sources, the sports websites, the political information sources, and the hobby-related sources each can be used to predict a period when an item from any one of those sources will be needed next. For example, if an item from a news website is evicted on a weekday, it will likely be needed again on the next weekday morning during a period when the user visits the news website. Similarly, if an item from the hobby-related website is evicted on a weekday, it will likely not be needed until a period in the next weekend. But, if an item from the hobby-related website is evicted on a Saturday, it will likely be needed again during a period later on Saturday.

Using the outputs of components 408 and 410, model 406 produces, and application 402 outputs weight 412. Application 402 associates weight 412 with item 404.

Figure 5:
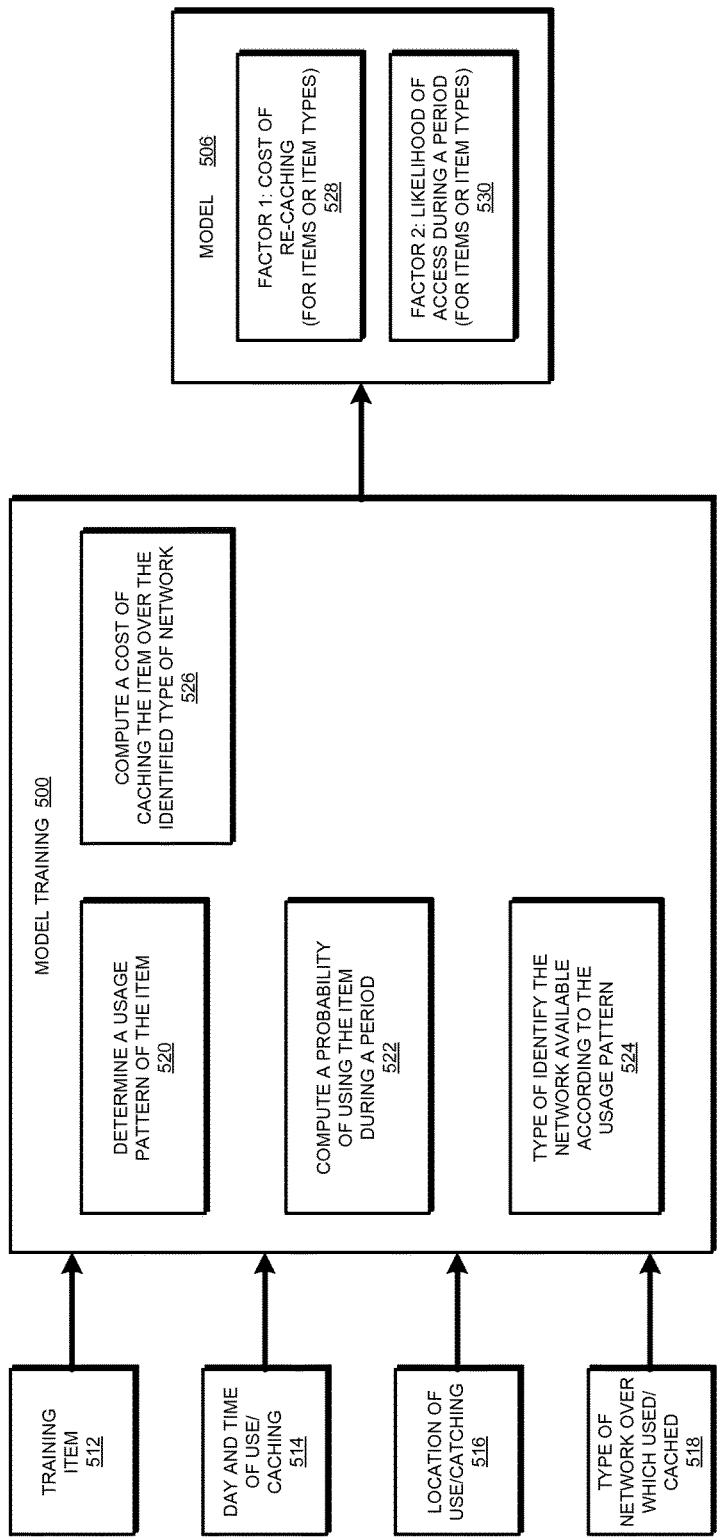
FIG. 5 depicts a block diagram of an example process for training a cached item weighting model in accordance with an illustrative embodiment.

With reference to FIG. 5, this figure depicts a block diagram of an example process for training a cached item weighting model in accordance with an illustrative embodiment. Model training process 500 produces model 506. Model 506 is usable as model 406 in FIG. 4.

Model training process 500 receives as input any number of sets of training item information. A set of training item information includes training item 512, which is a previously cached item from a browser cache at the device where model 506 will execute. Training item 512 has a type (not shown), and many different training items 512 may share a common type.

The set of training item information further includes day of the week and time 514 when training item 512 was used, location of 516 the device when training item 512 was used, and type of network 518. Type of network 518 is a type of network over which training item 518 was received at the device, or a type of network that was available to the device when training item was used.

Using a set of training item information, process 500 determines (520) a usage pattern of training item 512. For example, given many sets of training item information, several sets may include the same training item with different combinations of days, times, locations, and types of networks information, and such different combinations are usable for statistically determining a usage pattern for training item 512.

Process 500 computes (522) a probability that training item 512 will be used during a given period. The period may be a period that has already elapsed and from which at least some of the sets of training item information have been generated.

Process 500 identifies (524) the type of network that is likely to be available at the given period according to the usage pattern. Process 500 computes (526) a cost of caching the item over the identified type of network. For example, process 500 computes the cost at step 526 by using a price schedule (not shown) for using the network. A user may supply the price schedule, a default price schedule for some types of networks may be pre-configured, process 500 may obtain a price schedule, such as from a service provider, or some combination thereof.

By performing steps 520-526 in this manner over a plurality of sets of training item information, process 500 produces model 506. Model 506 includes, but is not limited to, at least two factors using which a weight of an actual cached item can be computed in a manner described in this disclosure. One of the factors (528) is a cost of re-caching an item or a type of item during a period if the item or the type of item is evicted from a browser cache. Another factor (530) is a likelihood or probability that an item or a type of item will be needed or accessed over a network during the period.

Figure 6:
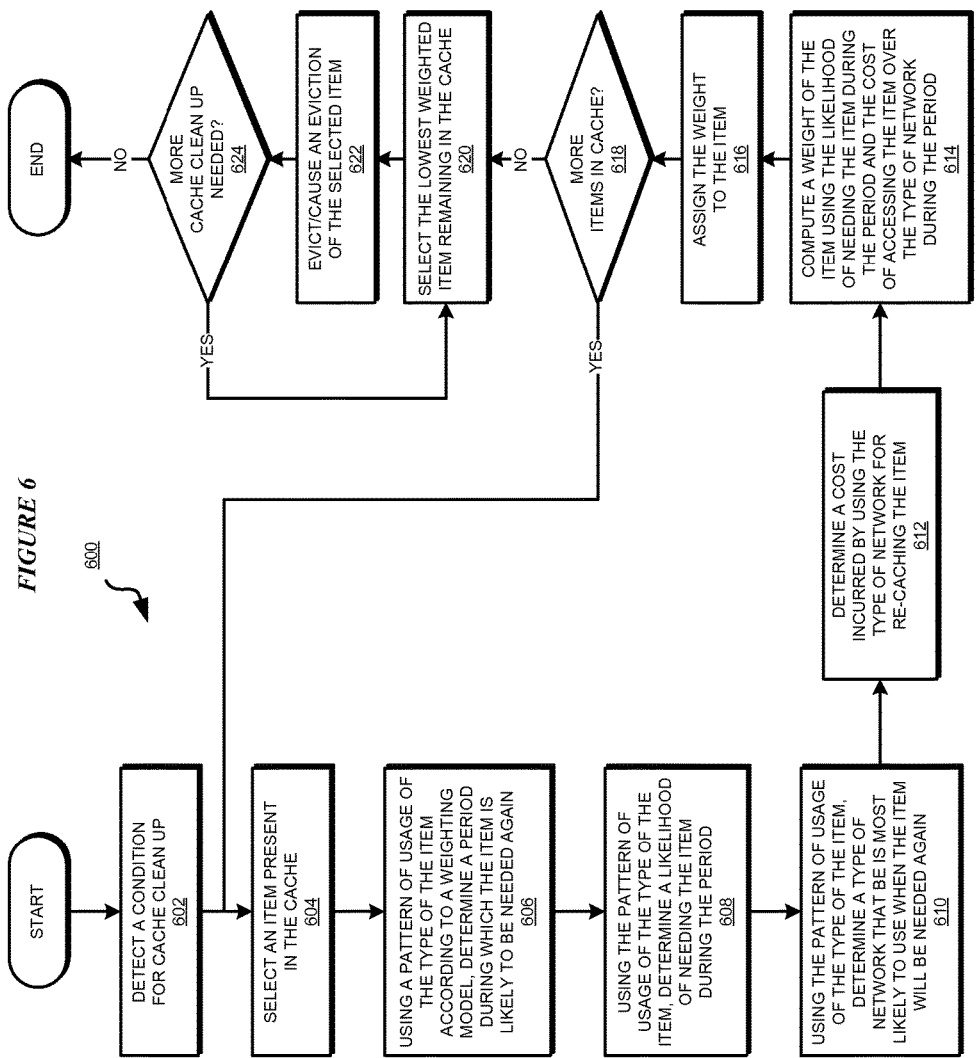
FIG. 6 depicts a flowchart of an example process for cost sensitive browser cache cleanup in accordance with an illustrative embodiment.

With reference to FIG. 6, this figure depicts a flowchart of an example process for cost sensitive browser cache cleanup in accordance with an illustrative embodiment. Process 600 can be implemented in application 402 in FIG. 4.

The application detects a condition that has to be remedied through a browser cache cleanup (block 602). One example condition may be that the browser cache usage has exceeded a preset usage threshold and some cached items have to be evicted. Another example condition may be that the browser is reporting an unacceptable latency because of insufficient cache space, and some cached items have to be evicted to allow the browser to store new cache items.

The application selects an item that is present in the browser cache (block 604). Using a pattern of usage of the item or the type of the item, according to a weighting model, the application determines a period during which the item is likely to be needed again (block 606). In some cases, the period can be specified, such as in FIG. 4, where period 405 was described as an input. In other cases, as described elsewhere in this disclosure, a pattern of usage of an item can itself reveal a period when the item can be expected to be used.

Using the pattern of usage of the item or the type of the item, from the model, the application determines a likelihood of needing the item during the determined or supplied period (block 608). For example, an item may be from a news website, but it may be a website that the user visits only occasionally, such as once or twice every week. Another item may be from another news website which the user visits regularly, such as every weekday morning. Other considerations in making this determination notwithstanding, the likelihood that the first item will be needed during a particular period on a weekday morning is going to be less than the likelihood that the second item will be needed during the same period. Furthermore, one or both probabilities may be below a threshold probability, or meet or exceed the threshold probability.

Using the model, the application identifies a type of network that will be available to the device, or is most likely to be used, when the item has to be re-obtained from a source during the period (block 610). The application determines a cost incurred by using the identified type of network to obtain the item again during the period of block 606 (block 612). Re-caching is the obtaining an item over a network and storing the item into a browser cache. Because the only network cost is in obtaining the item over a network, and storing an item into a cache does not incur any network costs, the cost of obtaining the item over a network is interchangeably referred to as a cost of re-caching the item when discussing costs of an item in this disclosure.

Using the probability of needing the item again during a period after the selected item has been evicted, and using the cost of re-caching the item, the application computes a weight for the selected item (block 614). The application assigns the computed weight to the selected item (block 616).

The application determines whether more items remain in the cache that have to be weighted in this manner (block 618). If more items have to be weighted ("Yes" path of block 618), the application returns process 600 to block 604 to select another item. If no more items have to be weighted ("No" path of block 618), the application selects the lowest weighted item in the cache (block 620). The application selects for eviction, evicts, or causes to be evicted, the lowest weighted item (block 622).

The application determines if more cache cleanup is needed by evicting more items from the cache (block 624). If more cache cleanup is needed ("Yes" path of block 624), the application returns process 600 to block 620 to select from the remaining weighted items the remaining lowest weighted item. If no more cache cleanup is needed ("No" path of block 624), the application ends process 600 thereafter.

Thus, a computer implemented method is provided in the illustrative embodiments for cost sensitive browser cache cleanup. Where an embodiment or a portion thereof is described with respect to a type of device, the computer implemented method is adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for browser cache cleanup, the method comprising:
    computing, using a processor and a memory of a device, to consider for eviction a data item stored in a cache of a browser application, a probability that the data item will be needed again during a period after the eviction;
    determining a type of a data network that will be available at the device during the period;
    computing, a cost of obtaining the data item over a data network of the type of the data network, from a location of the device during the period;
    computing, using the probability that the data item will be needed again during the period, and further using the cost of obtaining the data item over the data network, a weight of the data item;
    associating the weight with the data item as a part of associating a set of weights with a set of data items in the cache; and
    selecting for eviction from the cache the data item because the weight is a lowest weight in the set of weights.

2. The method of claim 1, further comprising:
    determining, using a set of historical data item information, a historical usage pattern of the data item, wherein each member in the set of historical data item information comprises the data item and a combination of a particular day and time when the data item was used in past, a particular location from where the data item was used at the particular day and time, and a particular type of network available at the device at the particular location at the particular day and time;
    constructing a weighting model using the historical usage pattern, wherein the weighting model produces the probability that the data item will be needed again during the period, and the cost of obtaining the data item over the data network; and using, as a part of computing the weight, the weighting model.

3. The method of claim 1, wherein the cost is a monetary cost that is financially incurred from the data network.

4. The method of claim 1, further comprising:

using, in computing the cost, a pricing information for performing a data transfer over the data network during the period from the location.

5. The method of claim 1, further comprising:

determining the location using a historical usage pattern of the data item, wherein the location according to the historical usage pattern is a geographical place where the device was situated in past during a use of the data item.

6. The method of claim 1, further comprising:

detecting a condition that an amount of storage space has to be reclaimed in the cache, wherein the condition comprises a utilization of the cache exceeding a utilization threshold.

7. The method of claim 1, further comprising:

determining the period using a historical usage pattern of the data item, wherein the historical usage pattern is indicative of a day of week and a time duration during which the data item has been used in past, wherein the period comprises the time duration in the day of week in future.

8. The method of claim 1, wherein the device is a mobile device, the browser is a mobile browser, and the cache is a portion of a storage device configured for use with the mobile device.

* * * * *